United States Patent [19]

Yamada et al.

[11] 4,076,890

[45] Feb. 28, 1978

[54] MAGNETIC RECORDING MEDIUM

[75] Inventors: Yasuyuki Yamada; Goro Akashi; Hiroshi Ogawa, all of Kanagawa, Japan

[73] Assignee: Fuji Photo Film Co., Ltd., Kanagawa, Japan

[21] Appl. No.: 403,351

[22] Filed: Oct. 4, 1973

[30] Foreign Application Priority Data

Oct. 5, 1972 Japan .................................. 47-100083

[51] Int. Cl.$^2$ ............................................. H01F 10/02
[52] U.S. Cl. ................................. 428/337; 428/323; 428/327; 428/328; 428/329; 428/330; 428/331
[58] Field of Search ................................. 117/234–240; 252/62.54; 427/127–132; 428/900, 323, 337, 327, 447, 328, 329, 330, 331

[56] References Cited

U.S. PATENT DOCUMENTS

| | | | |
|---|---|---|---|
| 3,476,595 | 11/1969 | Nacci | 117/235 X |
| 3,526,533 | 9/1970 | Jacknow et al. | 117/161 X |
| 3,542,589 | 11/1970 | Hartmann et al. | 117/235 |
| 3,630,910 | 12/1971 | Akashi et al. | 117/235 X |
| 3,713,886 | 1/1973 | Fulton et al. | 117/161 X |
| 3,740,266 | 6/1973 | Akashi et al. | 117/235 X |
| 3,767,464 | 10/1973 | Akashi et al. | 117/237 |
| 3,781,210 | 12/1973 | Lohoff | 117/235 |

OTHER PUBLICATIONS

IBM Tech. Disc. Bull., vol. 9. No. 7, Dec. 1966, p. 779, Friedman, et al.

*Primary Examiner*—Bernard D. Pianalto
*Attorney, Agent, or Firm*—Sughrue, Rothwell, Mion, Zinn and Macpeak

[57] ABSTRACT

A magnetic recording medium comprising a support having thereon a magnetizable recording layer containing a ferromagnetic powder dispersed in a binder, said magnetizable recording layer containing a silane coupling agent.

8 Claims, No Drawings

MAGNETIC RECORDING MEDIUM

BACKGROUND OF THE INVENTION

1. Field of the Invention

The present invention relates to processing of a magnetic substance for use in a magnetic recording medium, particularly for use in a magnetic recording medium enabling high density recording, such as video tapes, computer tapes, and the like.

2. Description of the Prior Art

The conventionally known magnetic recording medium has been prepared by first kneading a ferromagnetic fine powder, an organic binder, a pigment-dispersing agent, a surface active agent to impart antistatic characteristics, an aging inhibitor and a lubricant, together with an organic solvent, and then applying the prepared magnetic coating mixture to a plastic base or similar suitable support followed by drying. With the thus obtained high density recording tapes, in particular video tapes and computer tapes, drop-out due to delamination of the magnetizable surface has often occurred. This results in serious difficulties.

SUMMARY OF THE INVENTION

The inventors have found that the defect of the above-described prior art magnetic tapes for high density recording can be greatly reduced and, at the same time, the abrasion resistance of the magnetizable layer to the recorder head and to the recorder guide can be markedly improved, by processing the magnetic substance with a silane coupling agent.

Furthermore, it has also been found that when a magnetic tape in which a magnetic substance has been processed in the above-described manner is slit using a slitting method such as a rotating edge, powder-dusting from the tape edge can be greatly reduced.

DETAILED DESCRIPTION OF THE INVENTION

In general, a long, wide sheet is slit into a number of magnetic tapes at one time using rotatory blades or the like. During this slitting, if the adhesion between the magnetic substance and the binder and the adhesion between the magnetizable layer and the support are insufficient, the phenomenon of cracking, potential destruction or breakage, which gradually develops during the running of the tape to such an extent that the magnetic substance falls off successively from the edge portion of the magnetic tape, resulting in the so-called drop-out phenomenon, occurs. However, it has now been found that when the method of the present invention is employed, the powder-dusting drop-out phenomenon which results from the cracking of the magnetic layer, potential destruction or breakage thereof, is remarkably reduced. This reduction in drop-out can be attributed to the extremely strong adhesion between the magnetic substance and the binder.

That is, the present invention comprises in one embodiment a magnetic recording medium comprising a support having thereon a magnetizable recording layer in which a ferromagnetic powder is dispersed in a binder, with the magnetic recording layer containing a silane coupling agent; and in a second embodiment, a magnetic recording medium comprising a support having thereon a magnetizable recording layer in which a ferromagnetic powder is dispersed in a binder, with the solid powder components present in the magnetizable recording layer having been processed with a silane coupling agent.

The magnetizable powders which can be used in the present invention include the generally known and conventional ferromagnetic powders. Suitable ferromagnetic powders are $\delta$-$Fe_2O_3$, Co doped $\delta$-$Fe_2O_3$, $Fe_3O_4$, Co-doped $Fe_3O_4$, $CrO_2$, ferromagnetic alloy powders or mixtures thereof, e.g., as described in Japanese Patent Publication Nos. 14090/69; 18372/70; 22062/72; 22513/72; 28466/71; 38755/71; 4286/72; 12422/72; 17284/72; 18509/72; 18573/72; and the like.

Specific examples of these ferromagnetic alloy powders are as follows:

Fe-Co, Fe-Ni, Fe-Co-Ni, Fe-Ni-Zn, Fe-Mn-Zn, Fe-Co-Ni-B, Fe-Co-Ni-Cu-Zn, Fe-Co-Ni-Cr, Fe-Co-Ni-P, Fe-Ga-As, Fe-As-Te, Fe-Mn, Zn-Cr, Ni-Co, Ni-Cu, Ni-Cr, Co-Mn, Co-Mg, Ni-Co-As-Sb, Ni-Co-As-Sb, Cr-Ga-As, Cr-As-Te, and Cr-As-Sb, and the like.

These alloys are well-known in the art and are described in U.S. Pat. Nos. 3,026,215; 3,031,341; 3,100,194; 3,242,005 and 3,389,014; British Pat. Nos. 752,659; 782,762 and 1,007,323; French Pat. No. 1,107,654; German Pat. No. OLS 1,281,334. These ferromagnetic powders are generally used at about 300 parts by weight in a binder at a level of about 50 to about 200 parts by wt., preferably 70 to 150 parts by wt. The particle size range of the ferromagnetic powder generally employed is a particle size of 0.2 to 2 microns in length, and a length 1/1 to 20/1.

Solid additive particles generally present in the magnetizable layer are inorganic particles such as carbon black, graphite, molybdenum disulfide, tungsten disulfide, clay, silica, carbonates, alumina powder, abrasive materials, metal oxides, etc., and these are particularly effective. Organic particles such as fine powders of fluorine-containing resins, polyolefin resins, polyamide resins, etc., can also be incorporated with no particular detrimental influences. The fluorine-containing resins generally have a molecular weight from about 80,000 to about 120,000 and are materials such as trifluorochloroethylene, tetrafluoroethylene, etc., the polyolefin resins generally have a molecular weight of about 800,000 to about 1,200,000 and are materials such as polyethylene, polypropylene, etc., and the polyamide resins generally have a molecular weight of about 5,000 to about 200,000 and are materials such as 6-nylon, 6,6-nylon, 6,10-nylon, 7-nylon, 9-nylon, 11-nylon, and the like. These materials are described in Japanese Patent Publication Nos. 40461/71 and 32001/72. These solid additive particles are added, in particular, as antistatic agents, lubricants, surface-matting agents or a tape durability-improving agents as described in U.S. Pat. Nos. 3,293,066; 2,258,106; 3,312,563; 3,617,378; and 3,630,914. They are often utilized generally in the production of tapes at a level of about 0.1 to 25 wt.%, preferably 0.2 to 13 wt.%, of the inorganic or organic particles per 100% by wt. of the ferromagnetic powder; with particle sizes of about 0.02 to about 2 microns, preferably 0.08 to 1 micron, being generally used.

As the binder used for the recording layer in the present invention, a conventionally known thermoplastic resin, thermosetting resin, (or reaction-type resin) or mixtures thereof are used.

As the thermoplastic resins, those having a softening point of less than 150° C, a mean molecular weight of about 10,000 to about 200,000 and a copolymerization degree of about 400 to about 500, such as vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-stryene copolymers, methacrylate-acrylonitrile copolymers, methacrylate-vinylidene chloride copolymers, methacrylate-styrene copolymers, urethane elastomers, polyvinyl fluorides, vinylidene chloride-acrylonitrile copolymers, butadiene-acrylonitrile copolymers, polyamide resins, polyvinyl butyrals, cellulose derivatives (such as cellulose diacetate cellulose triacetate, cellulose propionate, cellulose acetate butyrate, nitrocellulose etc.), styrene-butadiene copolymers, polyester resins, chlorovinyl ether-acrylate copolymers, amino resins, various synthetic rubber thermoplastic resins, and the like, are used.

Specific examples of such resins are illustrated in Japanese Patent Publication Nos. 6877/62, 12528/64; 19282/64; 5349/65; 20907/65; 9463/66; 14059/66; 16985/66; 6428/67; 11621/67; 4623/68; 15206/68; 2889/69; 17947/69; 18232/69; 14020/70; 14500/70; 18573/72; 22063/72; 22064/72; 22068/72; 22069/72; 22070/72; 27886/72; and the like.

The thermosetting resin or reaction-type resin used preferably has a molecular weight of less than about 200,000 in the state of a coating solution and, upon heating after coating and drying, the molecular weight becomes infinite due to the reaction of condensation, addition, etc. Of these resins, those which are not softened or melted before the thermal condensation are preferred. To be specific, there are, for example, phenol resins, epoxy resins, polyurethane thermosetting-type resins, urea resins, melamine resins, alkyd resins, silicone resins, acrylic reactive resins, epoxy-polyamide resins, a mixture of a high molecular weight polyester resin and an isocyanate prepolymer, a mixture of a methacrylate copolymer and a diisocyanate prepolymer, a mixture of polyester polyol and a polyisocyanate, urea-formaldehyde resins, a mixture of a low molecular weight glycol/high molecular weight diol/triphenylmethane-isocyanate, polyamide resins and mixtures thereof.

Such resins are illustrated in Japanese Patent Publication Nos. 8103/64; 9779/65; 7192/66; 8016/66; 14275/66; 18179/67; 12081/68; 28023/69; 14501/70; 24902/70; 13103/71; 22065/72; 22066/72; 22067/72; 22072/72; 222073/72; 28045/72; 28048/72; 28922/72; and the like.

The magnetic recording layer is formed by dissolving the above-described composition in an organic solvent and applying the resulting coating solution to the base support. As the organic solvent used upon coating, there can be employed ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, propyl acetate, amyl acetate, ethyl lactate, glycol acetate monoethyl ether, etc.; ethers; glycol ethers such as glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, trichloroethane, dichlorobenzene, and the like.

Suitable supports which can be used in the present invention are those having a thickness of about 5 to 50 $\mu$, preferably 10 to 40 $\mu$, and suitable examples of supports are supports of polyesters such as polyethylene terephthalate; polyolefins such as polypropylene; cellulose derivatives such as cellulose triacetate, cellulose diacetate; polycarbonate, and the like.

The term "silane coupling agent" as used herein covers a silane compound wherein one terminal of the silane molecule is bonded to a halogen atom or a methoxy group and the other terminal is bonded to a group reactive with many organic substances, such as a vinyl group, an epoxy group, an amino group, an aminoalkyl group, etc. Such silane coupling agent is believed to function by the formation of bridges of strong chemical bonds between the organic substances and the inorganic substances.

Additionally, in the reaction between the silane coupling agent and the inorganic substances, it is believed that the halogen or methoxy group is hydrolyzed to form a silanol, which then reacts strongly.

The silane coupling agents which can be used in this invention have the following general formula:

$$(A)_q - Si(R_1)_n(R_2)_{3-n}$$ 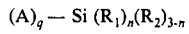

wherein, $R_1$ and $R_2$ are each a hydrogen atom, a hologen atom such as a chlorine atom or a bromine atom, $-R_3$, $-OR_3$ or $-OCOR_3$; A is a hydrogen atom, a halogen atom such as a chlorine atom or a bromine atom, $-R_3$, $ClR'_3$, $CH_2=CH-$, $HS-CH_2)_m$, $NH_2-CH_2)_m$, $NH_2-CH_2)_m$ $NH-CH_2)_m$, $CH_2=CCH_3COO-CH_2)_m$, $CH_2=CHCOO-CH_2)_m$,

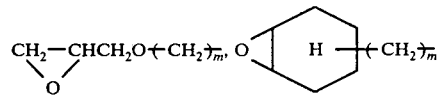

or a phenyl group; $R_3$ is a monovalent alkyl group having from 1 to 5 carbon atoms; $R'_3$ is the divalent moiety of said $R_3$; $n$ is a number of from 0 to 3; $m$ is a number of 2 or 3; $q$ is an number of 0 or 1, with $R_1$ and $R_2$ not being simultaneously a hydrogen atom.

Suitable examples of above-described silane coupling agents which can be used in this invention are as follows:

| | |
|---|---|
| Ethyltriethoxysilane | $C_2H_5Si(OC_2H_5)_3$ |
| Amyltriethoxysilane | $C_5H_{11}Si(OC_2H_5)_3$ |
| Ethyltrichlorosilane | $C_2H_5SiCl_3$ |
| Amyltrichlorosilane | $C_5H_{11}SiCl_3$ |
| Trichlorosilane | $HSiCl_3$ |
| Vinyltrichlorosilane | $CH_2=CHSiCl_3$ |
| Vinyltrimethoxysilane | $CH_2=CHSi(OCH_3)_3$ |
| Vinyltriethoxysilane | $CH_2=CHSi(OC_2H_5)_3$ |
| Phenyltrichlorosilane | $C_6H_5SiCl_3$ |
| Phenyltriethoxysilane | $C_6H_5Si(OC_2H_5)_3$ |
| Methyltrichlorosilane | $CH_3SiCl_3$ |
| Methyldichlorosilane | $CH_3SiHCl_2$ |
| Dimethyldichlorosilane | $(CH_3)_2SiCl_2$ |
| Methylvinyldichlorosilane | $CH_3CH_2=CHSiCl_2$ |
| Silicone Tetrachloride | $SiCl_4$ |

| | |
|---|---|
| Methyltriethoxysilane | $CH_3Si(OC_2H_5)_3$ |
| Methyltrimethoxysilane | $CH_3Si(OCH_3)_3$ |
| Dimethyldiethoxysilane | $(CH_3)_2Si(OC_2H_5)_2$ |
| Vinyl-tris(2-methoxyethoxy)-silane | $CH_2=CHSi(OCH_2CH_2OCH_3)_3$ |
| gamma-Acryloxypropyl-tris-(2-methoxyethoxy)silane | $CH_2=CHCOO(CH_2)_3Si(OCH_2CH_2OCH_3)_3$ |
| gamma-Acryloxypropyl-tributoxysilane | $CH_2=CHCOO(CH_2)_3Si(OC_4H_9)_3$ |
| gamma-Methacryloxy-propyl-trimethoxy-silane | $CH_2=CCH_3COO(CH_2)_3Si(OCH_3)_3$ |
| gamma-Methacryloxy-propyl-tris-(2-methoxyethoxy)silane | $CH_2=CCH_3COO(CH_2)_3Si(OCH_2CH_2OCH_3)_3$ |
| beta-(3,4-Epoxycyclohexyl)-ethyltrimethoxysilane | |
| gamma-Glycidoxypropyl-trimethoxy-silane | |
| Vinyltriacetoxysilane | $CH_2=CHSi(OOCCH_3)_3$ |
| gamma-Mercaptopropyl-trimethoxysilane | $HS(CH_2)_3Si(OCH_3)_3$ |
| gamma-Aminoethyl-triethoxysilane | $NH_2CH_2)_2Si(OC_2H_5)_3$ |
| gamma-Aminopropyl-triethoxysilane | $NH_2(CH_2)_3Si(OC_2H_5)_3$ |
| N-beta-Aminoethyl-gamma-aminopropyl-trimethoxysilane | $NH_2(CH_2)_2NH(CH_2)_3Si(OCH_3)_3$ |
| gamma-Chloropropyl-trimethoxysilane | $Cl(CH_2)_3Si(OCH_3)_3$ |

Other silane coupling agents which can be used as silane coupling agents such as aminoalkyltriethoxysilane, aminoalkyltrimethoxysilane, triaminoalkyltrimethoxysilane, aminosilane, ureido modified aminosilane, silyl peroxide, and the like.

These silane coupling agents can be used in an amount ranging from about 0.5% to 5% (by weight), preferably from 1% to 3% (by weight), based on the weight of the magnetizable substance and the inorganic particles.

As the methods of processing the magnetic substance, the following four methods, etc. are suitable:

(1) the silane coupling agent is diluted with water to prepare a 0.1 to 10% by weight aqueous solution thereof and, after blending this solution well with a magnetic substance using a blender, the mixture is dried for use;

(2) the magnetic substance is processed with a suitable organic solvent solution containing the silane coupling agent dissolved therein at a concentration of from 0.1 to 10% by weight;

(3) water is dissolved in a suitable organic solvent to the saturation level and the silane coupling agent is dissolved therein at a concentration of from 0.1 to 10% by weight to effect processing; and (4) the silane coupling agent is poured directly into a magnetic coating solution at a concentration of from 0.1 to 10% by weight.

Examples of organic solvents which can be employed in the above methods to prepare the solution are ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, propyl acetate, amyl acetate, ethyl lactate, glycol acetate monoethyl ether, etc.; ether; glycol ethers such as glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, trichloroethane, dichlorobenzene, and the like.

All of the above described methods can be employed but from the results obtained, process (1) described above was found to be the most preferred.

The same processing as described above is applied to the additive particles. That is, where such particles are processed with the silane coupling agent when they are in the form of particles, the most outstanding effects can be obtained. Where such additives particles are processed in accordance with this invention, the ferromagnetic particles should also be processed as well.

The present invention will now be illustrated in greater detail by reference to the following non-limiting examples of preferred embodiments of the present invention. Unless otherwise indicated all parts and percents are by weight.

EXAMPLE 1

A. 100 Grams of $\gamma$-$Fe_2O_3$ fine powder (1 × 0.3 × 0.3 $\mu$) and 8 g of carbon black powder (45 m$\mu$) were well mixed with 120 g of a 1% aqueous solution of a silane coupling agent (A-187, made by the Union Carbide Corp., the structure believed to be as follows:

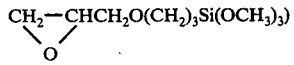

using a blender, and then dried at 90° C for 20 hours. To the resulting mixture were added 15 g of vinyl chloride-vinyl acetate copolymer (87:13 weight ratio; polymerization degree:4.6), 25 g of a polyurethane resin (a polyester polyol comprising 3 mol of adipic acid, 2 mol of 1,4-butylene glycol and 2 mol of hexanetriol and polyhexamethylene diisocyanate), 2 g of lecithin and, in addition a lubricant and an ageing inhibitor in small amounts. Then, 200g of methyl ethyl ketone (MEK) and methyl isobutyl ketone (MIBK) in a volume ratio of MEK/MIBK (1:1) was added thereto as a solvent, and the resulting mixture was subjected to ball mill-processing to prepare a magnetic coating solution. A magnetic tape containing a coated layer in a dry thickness of 10 μ was prepared using the coating solution according to a general process for producing magnetic tapes. Thus, Sample #1-1 was obtained.

B. In the same manner as described above except for omitting the processing with the silane coupling agent, Sample 190 1-2 was prepared C. Tape sample 190 1-3 was prepared by processing δ-$Fe_2O_3$ alone with 120 g of the 1% aqueous solution of the above-described silane coupling agent.

D. Tape sample 190 1-4 was prepared by processing carbon black alone with 20 g of the 1% aqueous solution of the above-described silane coupling agent.

EXAMPLE 2

A. 100 Grams of $Fe_3O_4$ fine powder (0.7 × 0.2 × 0.2 μ) and 4 g of $Al_2O_3$ fine powder (0.5 μ) were well mixed with 100 g of a 1% aqueous solution of a silane coupling agent (A-189, made by the Union Carbide Corp., the structure believed to be $HSCH_2CH_2CH_2Si(OCH_3)_3$) using a blender, and then dried at 90° C for 20 hours. A magnetic tape was prepared using the resulting mixture together with vinyl chloride-vinylidene chloride copolymer (80:20 weight ratio; polymerization degree : about 460) and epoxy resin binder the reaction product of epichlorohydrin and diphenylpropane; epoxy equivalent : 250; molecular weight; about 470 as described in Example 1, A). Thus, tape Sample #2-1 was prepared.

B. In the same manner as described above except for omitting the processing with the silane coupling agent, Sample 190 2-2 was prepared.

C. 2 Grams of the above-described silane coupling agent was dissolved in 100 g of a 4% by weight aqueous solution of ethyl acetate. Then, 100 g of $Fe_3O_4$ powder was processed with the resulting solution. After the processing, the mixture was dried at 80° C for one night. Then, a magnetic tape was formed in a similar manner using the resulting mixture. Thus, Sample #2-3 was prepared.

EXAMPLE 3

The procedures described in Example 1, A) were conducted except for replacing the silane coupling agent employed with $NH_2CH_2CH_2Si(OCH_3)_3$. Thus, Sample #3-1 was obtained.

Similarly, Samples #3-2 and 190 3-3 were obtained according to Example 1, C) and D) using the above-described silane coupling agent.

EXAMPLE 4

A. 100 g of $CrO_2$ fine powder was well mixed with 100 g of a 1% aqueous solution of a silane coupling agent represented by the following structural formula;

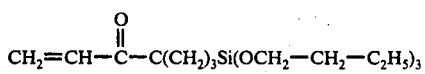

$$CH_2=CH-\overset{O}{\overset{\|}{C}}-C(CH_2)_3Si(OCH_2-CH_2-C_2H_5)_3$$

using a blender, then dried at 90° C for 20 hours. A tape was prepared from the resulting mixture in a conventional manner using as a binder a vinyl chloride-vinylidene chloride copolymer (80:20 weight ratio; degree of polymerization : 430) and a reactive acrylic resin. Thus, tape Sample #4-1 was prepared.

B. In the same manner as described above except for using $CrO_2$ fine powder which was not processed with the silane coupling agent, Sample #4-2 was prepared.

Table 1 shows the results of testing the abrasion resistance of the magnetic layer of each of the samples prepared in Examples 1 – 4 to a head and a recorder guide.

Table 1

| Item Sample | Abrasion Resistance to Head | Durable Load (g) Applied by Guide | Notes |
|---|---|---|---|
| #1-1 | More than 30 min. | 360* | Almost no surface change was observed up to 300 g of load. |
| 1-2 | Within 1 minute | 140 | |
| 1-3 | 28 min. | 420 | |
| 1-4 | 20 min. | 280 | |
| #2-1 | More than 30 min. | 400 | |
| 2-2 | 38 min. | 120* | Broad and deep streaks appeared all over the surface of the tape. |
| 2-3 | 23 min. | 320 | |
| #3-1 | More than 30 min. | 420* | Almost no surface change was observed up to 340 g of load. |
| 3-2 | More than 30 min. | 420 | |
| 3-3 | 24 min. | 360 | |
| #4-1 | More than 30 min. | 380 | |
| 4-2 | 18 sec.* | 100 | Output initially reduced to almost zero 7-8 seconds after starting the measurement, which might be attributed to the waste powder produced upon slitting. However, the output restored. |

*See Comment in Notes Column

Additionally, abrasion resistance to a magnetic head was measured by uniformly finishing up the surface of sample tapes to prepare ½ inch-wide video tapes for home use, presenting a stationary image and measuring the time required for the output level to become half that of the initial level. The results were relatively compared with each other.

In the rating of abrasion resistance of the tape samples to the recorder guide, a chromium-plated iron rod (diameter: 20 widths) having a surface believed to be as coarse as the guide surface was rotated at a rate of 240 rpm. A ½ inch-wide tape was suspended against the rod with the magnetic layer-coated surface facing the rod, and the load was gradually increased. After 5 minutes, the scraping condition was examined. Tapes having a great durability are difficult to flaw even at a heavy load. In the item of "Durable Load Applied by Guide" in Table 1, loads (g) at which broad and deep streaks were first formed on the magnetic layer of the tapes are shown. It is known that the higher these values, the greater is the durability of the tape to the guide roller.

As can be seen from the results contained Table 1, Samples #1-2, #2-2 and #4-2, in which magnetic substance not processed with a silane coupling agent was used, had inferior durability, whereas the other samples possessed has much better durability to the head and to the guide.

As is described above, the magnetic recording tape of the present invention has excellent feature with respect to abrasion resistance, which have not been observed in the conventionally used additives or processing methods.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a flexible support with a thickness of about 5 to 50 μ and having thereon a magnetizable recording layer containing an inorganic ferromagnetic powder and from 0.1 to 25% by weight of solid inorganic and organic powders, based on 100% by weight of said ferromagnetic powder and said inorganic powders present in said magnetizable recording layer having been processed with a silane coupling agent present in an amount of about 0.5 to about 5% by weight based on the weight of said ferromagnetic powder and said inorganic powder, said silane coupling agent reacting to form chemical bonds between organic and inorganic substances in said magnetizable layer, wherein said silane coupling agent has the following general formula:

wherein $R_1$ and $R_2$ each represents a hydrogen atom, a halogen atom, $-OR_3$, $-OCOR_3$ or $-R_3$; A represents a hydrogen atom, a halogen atom, $-R_3$, $ClR'_3-$, $CH_2=CH-$, $HS-CH_2)_m$, $NH_2-CH_2)_m$, $NH_2-CH_2)_mNH-CH_2)_m$, $CH_2=CCH_3COO-CH_2)_m$,

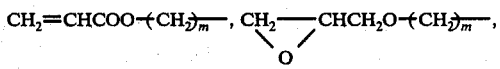

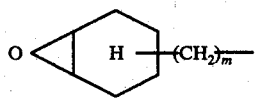

or a phenyl group; $R_3$ represents a monovalent alkyl group having from 1 to 5 carbon atoms; $R'_3$ is the divalent moiety of said $R_3$; n represents number of from 0 to 3; m represents a number of 2 or 3; and q represents a number of 0 to 1, with said $R_1$ and $R_2$ not being simultaneously a hydrogen atom; such that one terminal of said silane coupling agent is bonded to a halogen atom or a methoxy group and the other terminal of said silane coupling agent is bonded to a group reactive with said organic substances.

2. The magnetic recording material of claim 1, wherein said halogen or said methoxy group of said silane coupling agent reacts with said inorganic substances.

3. The magnetic recording material of claim 1, wherein said group of said silane coupling agent reactive with said organic substances is a vinyl group, an epoxy group, an amino group or an amino alkyl group.

4. The magnetic recording medium of claim 1, wherein said solid inorganic powders are selected from the group consisting of carbon black, graphite, molybdenum di-sulfide, tungsten di-sulfide, clay, silica, carbonates, alumina powder and metal oxides.

5. The magnetic recording medium of claim 1, wherein said silane coupling agent is selected from the group consisting of ethyltriethoxysilane, amyltriethoxysilane, ethyltrichlorosilane, amyltrichlorosilane, trichlorosilane, vinyltrichlorosilane, vinyltrimethoxysilane, vinyltriethoxysilane, phenyltrichlorosilane, phenyltriethoxysilane, methyltrichlorosilane, methyldichlorosilane, dimethyldichlorsilane, methylvinyldichlorosilane, silicone tetrachloride, methyltriethoxysilane, methyltrimethoxysilane, dimethyldiethoxysilane, vinyltris(2-methoxyethoxy)-silane, gamma-acryloxypropyl-tris-(2-methoxyethoxy) silane, gamma-acryloxypropyl-tributoxysilane, gamma-methacryloxypropyl-trimethoxysilane, gamma-methacryloxypropyl-tris-(2-methoxyethoxy)silane, beta-(3,4epoxycyclohexyl)ethyl-trimethoxysilane, gamma-glycidoxypropyl-trimethoxysilane, vinyltriacetoxysilane, gamma-mercaptopropyl-trimethoxysilane, gamma-aminoethyl-triethoxysilane, gamma-aminopropyl-triethoxysilane, N-beta-aminoethyl-gamma-aminopropyl-trimethoxysilane and gamma-chloropropyl-trimethoxysilane.

6. The magnetic recording medium of claim 1, wherein said ferromagnetic powder is δ-$Fe_2O_3$, Co-doped δ-$Fe_2O_3$, $Fe_3O_4$, Co doped $Fe_3O_4$, $CrO_2$, Fe-Co, Fe-Ni, Fe-Co-Ni, Fe-Ni-Zn, Fe-Mn-Zn, Fe-Co-Ni-B, Fe-Co-Ni-Cu, Fe-Co-Ni-Cu-Zn, Fe-Co-Ni-Cr, Fe-Co-Ni-P, Fe-Ga-As, Fe-As-Te, Fe-Mn, Zn-Cr, Ni-Co, Ni-Cu, Ni-Cr, Co-Mn, Co-Mg, Ni-Co-As-Sb, Ni-Co-As-Sb, Cr-Ga-As, Cr-As-Te, and Cr-As-Sb and wherein said binder is a thermoplastic resin or a thermosetting resin.

7. The magnetic recording medium of claim 1, wherein said organic powders are selected from the groups consisting of fluorine-containing resins, polyolefin resins and polyamide resins.

8. The magnetic recording material of claim 1, wherein said flexible support is composed of a material selected from the group consisting of polyesters, polyolefins, cellulose derivatives and polycarbonates.

* * * * *